United States Patent [19]

Duncan

[11] Patent Number: 4,806,258
[45] Date of Patent: Feb. 21, 1989

[54] STRAINING AND STOP VALVE

[75] Inventor: Ronnie J. Duncan, Leavenworth, Wash.

[73] Assignee: Remco Research and Development, Inc., Bellevue, Wash.

[21] Appl. No.: 93,814

[22] Filed: Sep. 4, 1987

Related U.S. Application Data

[62] Division of Ser. No. 4,722,794, Feb. 2, 1988.

[51] Int. Cl.⁴ ............................................. B01D 35/04
[52] U.S. Cl. ................................. 210/423; 137/550; 137/560; 137/625.22; 137/625.32; 137/625.47; 210/426; 210/427; 210/432
[58] Field of Search .................... 264/127; 137/625.21, 137/625.22, 625.31, 625.32, 625.46, 625.47, 248, 384, 249, 454.2, 250, 454.6, 315, 544, 329, 545, 329.01, 550, 329.02, 546, 329.03, 547, 329.04, 549, 329.05, 560; 267/64.12; 210/418, 420, 431, 422, 424, 432, 425, 426, 427, 428, 429; 285/317

[56] References Cited

U.S. PATENT DOCUMENTS

| | | | |
|---|---|---|---|
| 4,386,766 | 6/1983 | Bauer et al. | 267/64.12 |
| 4,613,112 | 9/1986 | Philipot et al. | 285/317 |
| 4,646,407 | 3/1987 | Mayhew | 264/127 |

Primary Examiner—Frank Sever
Attorney, Agent, or Firm—Seed and Berry

[57] ABSTRACT

A fluid filtering stop valve having a body with a cylindrical chamber having a circumferential sidewall with inlet, outlet and flush ports, and a cylindrical plug member rotatably disposed in the chamber. The plug member has spaced apart first and second circular plates with an off-center filtering screen extending therebetween. The plug member is rotatably between a filtering position in which the screen is located in the fluid flow between the inlet and outlet ports, a backflushing position in which the screen is located in the fluid flow between the inlet and flush ports, with the filtering side of the screen toward the flush port, and a closed position in which an arcuate plate washer loosely retained between the first and second plates is positioned to seal the flush and outlet ports. In the filtering position the washer seals only the flush port and in the flush position the washer seals only the outlet port. The screen uses outwardly diverging ribs to reduce lodging of material between the ribs. A second screen filters the fluid from the inlet port during backflushing.

6 Claims, 2 Drawing Sheets

STRAINING AND STOP VALVE

This application is a division of U.S. Pat. No. 4,722,794 granted Feb. 2, 1988.

DESCRIPTION

1. Technical Field

This invention relates generally to devices for removing foreign particles from a fluid stream, and more particularly, to a straining and stop valve, especially for use in farm irrigation lines having small stones and other debris in the incoming irrigation water.

2. Background Art

Many farmers require irrigation on a regular basis for the production of suitable crops. Irrigation is frequently accomplished by the use of irrigation lines set in the fields with sprinkler heads spaced at certain intervals. Often a sprinkler head will clog due to the presence of a small stone or accumulation of other debris in the sprinkler line or in the sprinkler head itself, requiring the supply of water to be turned off and the debris removed. The problem is greatest when the farmer uses less than clean and clear water, such as that from an irrigation ditch. Water flowing through such a ditch continually carries foreign particles to the sprinkler heads, which will clog and render them inoperative.

Common screening devices can be added in these irrigation lines; however, they are of limited value due to the nature and frequency of cleaning them. First, to clean the in-line screen, the water through the irrigation line must be shut off. The screen must then be removed and the foreign particles brushed or washed away. Finally, the screen must be fitted back in line and the water once again turned on. Many times, the water shut-off valve will be some distance from the clogged screen, and many sprinkler heads will be shut down while the cleaning operation occurs. This makes the operation time-consuming and inefficient. If no screening mechanism is used, the farmer will still need to go through the shut-off and cleaning procedure when a sprinkler head is clogged.

In the past, straining valves, such as those shown in British Pat. No. 16,460 and U.S. Pat. Nos. 8,052,237; 999,532; 3,348,694; 4,056,474 and 4,351,727, have been designed for the straining of fluids. These designs, however, have drawbacks. The designs may be too complicated in design, difficult or impossible to mold, or expensive to construct or assemble. The use of a diversion channel in the valve body, as described in U.S. Pat. No. 805,237, makes separation of the body from a mold impossible using current plastic injection molding techniques. The hollow valve plug described in British Pat. No. 16,460 (see FIG. 5) is similarly impossible to mold and could not be economically manufactured. In today's economy, if a valve cannot be inexpensively molded of plastic as a production part, the valve will not be competitive.

DISCLOSURE OF THE INVENTION

The present invention resides in a fluid filtering stop valve having a design which may be inexpensively manufactured by well-known production line molding techniques. The valve has a body having a cylindrical chamber with a circumferential sidewall. The sidewall has an inlet port and an outlet port, with a flush port position therebetween. The inlet and outlet ports are positioned substantially diametrically opposite each other. The valve also includes a cylindrical plug member rotatably disposed in the chamber.

The plug member has spaced-apart first and second substantially circular plates with a filtering screen extending therebetween. The screen has a filtering side for trapping particulate matter in the fluid flow through the valve. The plug member is rotatable between first, second, and third positions. In the first position, the screen is located in the fluid flow between the inlet and outlet ports, with the filtering side toward the inlet port for filtering. In the second position, the screen is located in the fluid flow between the inlet and flush ports with the filtering side toward the flush port for back-flushing. The screen is positioned off the diametrical center line of the plates to position the screen for sufficient fluid flow therethrough from the inlet port to the flush port to backflush the screen's filtering side when the plug member is rotated into the second position. In the third position, the valve is closed to stop all fluid flow.

The plug member further includes an arcuate seal positioned between the plates along a perimeter thereof. The seal is loosely retained between the plates for movement into sealing engagement with the side wall of the silt chamber in response to fluid pressure in the chamber. The seal is sized to seal the flush port when the plug member is rotated into the first position, to seal the outlet port when the plug member is rotated into the second position, and to seal the flush and outlet ports when the plug member is rotated into the third position.

The chamber has an open end to receive the plug member and an opposed, closed end wall. The second plate of the plug member is positioned in juxtaposition with the end wall, and slidably engages the end wall. The end wall has a circular aperture sized to rotatably receive and releasably retain a retainer member fixedly attached to the second plate and projecting outwardly therefrom. The retainer member has a substantially half round resilient shaft portion supporting a laterally projecting bulb portion. The bulb portion is positioned on the shaft portion a distance from the second plate sufficient to maintain the plug member within the chamber during operation of the valve. In particular, the bulb portion is spaced at a distance from the second plate substantially equal to the thickness of the end wall. The shaft portion has a center of curvature substantially corresponding to the center point of the end wall aperture.

The second plate has an indexing member fixedly attached thereto and projecting outwardly therefrom, and the end wall has an arcuate slot sized to receive and limit movement of the indexing member between end limit positions corresponding to the first and second positions of the plug member. The indexing member coacts with the slot to limit rotation of the member between these positions.

The filtering screen includes a plurality of generally transversely oriented ribs positioned in back to back relationship. The ribs on the filtering side of the screen having one directional orientation are outwardly tapered to provide an outwardly diverging space between adjacent ribs. The tapered ribs have a generally triangular cross section. In a presently preferred embodiment of the invention, the ribs on both sides of the screen have a tapered shape to provide a reversible screen. Using ribs with a triangular cross section, the ribs with one directional orientation are positioned to have their flat bases in back-to-back relationship with the flat bases of the ribs with opposite directional orientation.

The first and second plates have guides slidably and removably receiving the screen, and retain the screen against lateral movement in response to fluid flowing therethrough. The plates are held in fixed, spaced-apart relation by a plurality of support posts extending between the plates. One of the support posts is positioned to engage and prevent longitudinal movement of the screen between the guides in a direction toward the one support post. The first and second plates each have a circumferential edge groove with an O-ring disposed in each of the grooves.

An inward face of the arcuate seal is positioned in proximity with an edge portion of the screen. The seal has ears projecting inwardly from the inward seal face which are spaced apart sufficiently to receive and grasp the screen edge portion therebetween. A pair of the support posts are spaced apart and positioned to engage and limit inward radial movement and circumferential movement of the seal, while allowing outward radial movement of the seal for engaging the sidewall.

The valve further includes means for manually rotating the plug member, and a second filtering screen extending between the first and second plates. The second screen is positioned to filter fluid flowing into the chamber from the inlet port when the plug member is rotated into the second position for backflushing. The second screen is oriented generally transverse to the first screen.

Other features and advantages of the invention will become apparent from the following detailed description, taken in conjunction with the accompanying drawings.

BEST MODE FOR CARRYING OUT THE INVENTION

Figure 1:
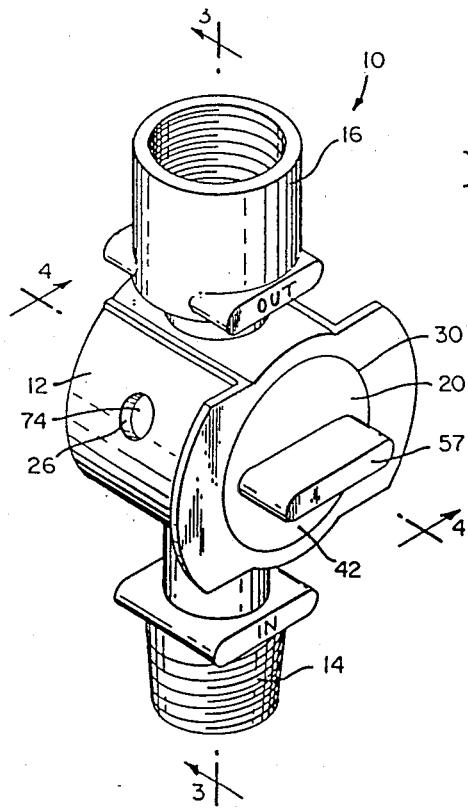
FIG. 1 is an isometric view of a valve embodying the present invention.
Figure 2:
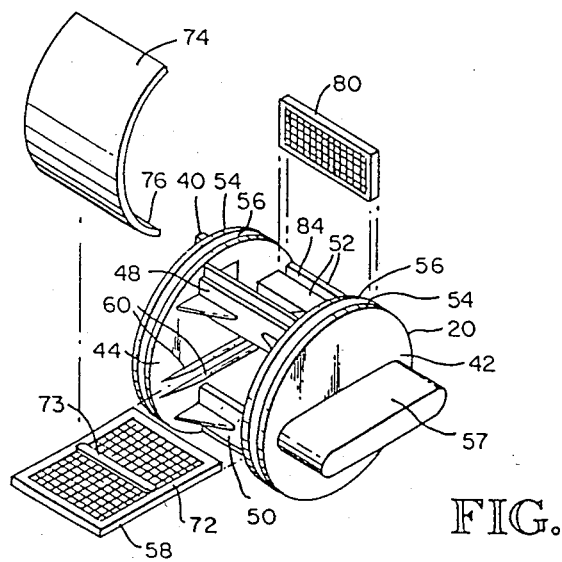
FIG. 2 is an isometric view of the plug assembly of the valve shown in FIG. 1, showing the primary and second filter screens and the arcuate plate washer removed from the assembly.

As shown in the drawings for purposes of illustration, the present invention is embodied in a valve, indicated generally by reference number 10. The valve 10 includes a valve housing or body 12 having a flanged, exteriorly threaded inlet portion 14 and a flanged, interiorly threaded outlet portion 16. The inlet and outlet portions 14 and 16 permit threaded coupling of the valve 10 between conduits, such as a conduit 17a from a water source and a conduit 17b leading to a sprinkler head or other water distribution device.

The body 12 of the valve 10 has a cylindrical chamber 18 axially oriented transverse to the inlet and outlet portions 14 and 16, and positioned therebetween. A rotatable valve plug assembly 20 is removably disposed within the chamber 18 for controlling the flow of fluid through the value 10. The flow of fluid is shown by arrows in the drawings.

An inlet port 22 of the chamber 18 communicates fluid between the inlet portion 14 and the chamber, and an outlet port 24 of the chamber communicates fluid between the chamber and the outlet portion 16. The chamber 18 also has a flush port 26, which, as will be described in more detail below, serves as an exhaust to the atmosphere for discharging from the chamber any particulate matter caught by the valve.

The cylindrical chamber 18 has a cylindrical interior sidewall 28 through which the inlet, outlet and flush ports 22, 24 and 26 pass. The inlet and outlet ports 22 and 24 are positioned diametrically opposite each other, with the flush port 26 being positioned circumferentially halfway therebetween. One axial end 30 of the chamber 18 is opened for receiving the plug assembly 20 during assembly, and the opposite end is closed by an end wall 32 having a centrally located opening 34 therethrough and an interiorly facing arcuate slot 36 therein. The end wall opening 34 releaseably receives a resilient member 38 of the plug assembly 20, which rotatably retains the plug assembly within the chamber 18, and the slot 36 receives an indexing tab 40 of the plug assembly, which limits the rotation of the plug assembly within predetermined end limits.

Figure 4:
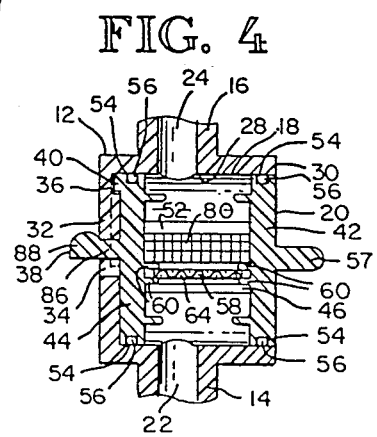
FIG. 4 is a reduced, fragmentary, sectional view taken substantially along the lines 4—4 of FIG. 1.

The plug assembly 20 includes a circular top plate 42 and a circular base plate 44, held in fixed, spaced-apart relation by first through fourth support posts 46, 48, 50 and 52 extending between and fixedly attached to the inward faces of the plates. As best shown in FIG. 4, the plates 42 and 44 are spaced apart such that with the plug assembly 20 fully inserted into the chamber 18 for operation, the outward face of the base plate 44 slidably engages the inward face of the end wall 32, and the outward face of the top plate 42 is flush with the open end 30 of the chamber.

The top and base plates 42 and 44 each have a circumferencial edge wall groove 54 sized to receive and retain a conventional O-ring 56 to provide a fluid-tight seal between the plates and the interior sidewall 28 of the chamber 18. The inlet, outlet and flush ports 22, 24 and 26 are located in the sidewall 28 between the top and bottom base plates 42 and 44. A manually operable handle 57 projects from an outward face of the top plate 42 for rotation of the plug assembly 20 during operation.

The plug assembly 20 further includes a primary filter screen 58 removably retained and supported between the top and base plates 42 and 44 by guides 60. Each guide 60 comprises a pair of elongated ridges protruding inwardly from the inward face of one of the plates 42 and 44. The ridges of the guides 60 are spaced apart sufficiently to slidably receive and retain an edge portion of the screen 58 therebetween.

The screen 58 is also retained and supported by the first support post 46. The first support post 46 has an L-shape with a short leg portion 46a positioned at and transverse to one end of the guides 60, toward an edge portion of the plates 42 and 44. An edge portion of the screen 58 is received and retained in an inwardly facing channel 62 of the short leg portion 46a. As such, the short leg portion 46a prevents longitudinal movement of the screen 58 relative to the guides 60 in one direction and also supports the screen against lateral movement under the force of the fluid flow.

Figure 3:
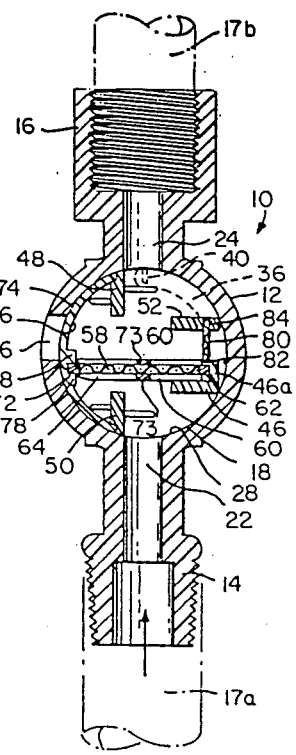
FIG. 3 is a reduced, sectional view taken substantially along the lines 3—3 of FIG. 1 showing the valve in the filtering mode.
Figure 5:
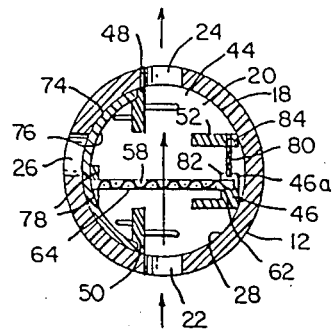
FIG. 5 is a sectional view of the chamber and plug assembly of the valve shown in FIG. 1, showing the plug assembly rotated for filtering.
Figure 7:
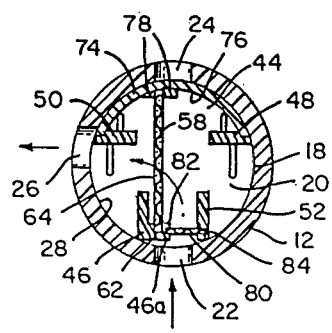
FIG. 7 is a sectional view of the chamber and plug assembly of the valve shown in FIG. 1, showing the plug assembly rotated into the backflushing mode.

The screen 58 is positioned off the diametrical center line of the top and base plates 42 and 44, as are the guides 60 and the first support member 46, sufficiently to allow fluid flowing from the inlet port 22 to enter the chamber 18 primarily on the side of the screen opposite a filtering side 64 of the screen when the plug assembly 20 is rotated for backflushing, as shown in FIG. 7. The screen 58 is positioned, however, transverse to the fluid flow between the inlet and outlet ports 22 and 24 when the plug assembly 20 is rotated for filtering, as shown in FIGS. 3 and 5. With this off-center positioning of the screen 58, no internal or external diversion channels are required and the chamber 18 can be molded with a simple cylindrical shape.

Figure 8:
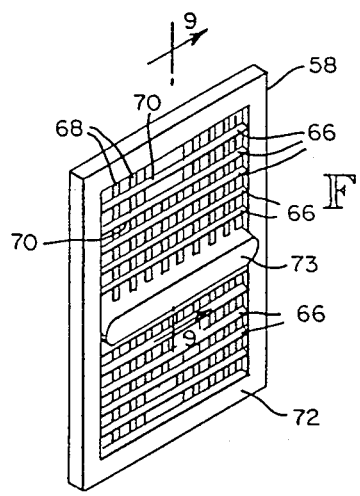
FIG. 8 is an isometric view of the primary filter screen of the valve of FIG. 1.
Figure 9:
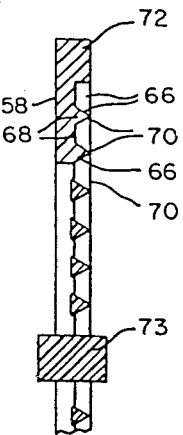
FIG. 9 is an enlarged, fragmentary, sectional view taken substantially along the lines 8—8 of FIG. 8.

As best shown in FIGS. 8 and 9, the screen 58 is formed by a plurality of transversely oriented ribs 66. Each of the ribs 66 has a substantially triangular cross-section with a flat base 68 and an apex 70. In the presently preferred embodiment of the screen 58, the flat base 68 of each rib 66 faces inward, placing the flat bases of the ribs with one directional orientation in back-to-back relationship to the flat bases of the ribs with the transverse directional orientation. The apex 70 of each rib 66 faces outward. A frame 72 defines the edge portions of the screen 58. A center support 73 adds structural rigidity and strength to the screen 58.

With such a shape, the screen 58 can be easily molded and is reversible, so that regardless of which side of the screen is serving as the filtering side 64, the ribs 66 present an inwardly converging profile to fluid passing therethrough for filtering. Consequently, particulate matter trapped by the screen 58 on the filtering side 64 is less likely to become tightly compacted and lodged between the ribs 66, or to adhere to the ribs. Since the ribs 66 of the screen 58 present an outwardly diverging profile to the fluid passing therethrough for backflushing, the cleansing of the screen is more efficient and effective. As used herein, particulate matter includes particles as well as debris and foreign matter of any shape and size.

The plug assembly 20 has an arcuate plate washer 74 retained between the top and base plates 42 and 44, at the perimeter of the plates, and extending circumferentially about a portion thereof. The washer 74 has substantially the same radius of curvature as the top and base plates 42 and 44, and is loosely held in place between the plates by the second and third support posts 48 and 50. The support posts 48 and 50 are positioned one to each side of the screen guides 60, toward an opposite edge portion of the plates 42 and 44 from the first support post 46, and position an inward face 76 of the washer 74 adjacent to an edge portion of the screen 58. The inward face 76 of the washer 74 is provided with a pair of ears 78 spaced apart to receive and retain the edge portion of the screen 58 therein. The ears 78 lightly grasp the screen 58 and serve to hold the washer 74 in place during assembly of the plug assembly 20, particularly when the plug assembly is being inserted into the chamber 18, and serve to support the screen against lateral movement during operation of the valve 10.

The second and third support posts 48 and 50 have shoulders formed to receive the end portions of the washer 74 and prevent significant circumferential or radially inward movement of the washer. The washer 74 is, however, free to move radially outward responsive to fluid pressure in the chamber 18 to press the washer into tight sealing engagement with the interior sidewall 28 of the chamber and thereby prevent the flow of fluid through one or more of the inlet, outlet or flush ports 22, 24 and 26, as will be described in more detail below. While the washer 74 has sufficient rigidity to be self-supporting and hold its shape, it is sufficiently flexible to generally conform to the interior sidewall 28 of the chamber 18 under fluid pressure and form a tight seal. The use of the separate sealing washer 74 avoids the difficulty of precisely sizing a plug so that its sidewalls provide a sufficient sealing of the ports in the valve chamber wall.

A second filter screen 80 may also be incorporated as part of the plug assembly 20 for filtering fluid entering the chamber 18 from the inlet port 22 for backflushing the primary screen 58. The second screen 80 is removably retained and supported between the top and base plates 42 and 44, and is oriented substantially perpendicular to the primary screen 58. An edge portion of the second screen 80 is slidably received and retained by a channel 82 formed in the short leg portion 46a of the first support post 46, and an opposite edge portion of the screen is slidably received and retained by a slot 84 extending fully through the fourth support post 52.

The resilient member 38 of the base plate 44 has a half-round shank portion 86 which resiliently supports a half-round bulb portion 88. The bulb portion 88 projects laterally from the shank portion 86 and is spaced along the shank portion away from the outward face of the base plate 44 by approximately the thickness of the end wall 32 of the chamber 18. The shank portion 86 is positioned on the base plate 44 so as to have a center of curvature corresponding to the center point of the end wall opening 34. As such, the bulb portion 88 is deflected radially inward when inserted into the end wall opening 34; and after passing therethrough, the resiliency of the shank portion 86 moves the bulb portion radially outward to provide a snap fit and retain the plug assembly 20 within the chamber 18. The plug assembly 20 is easily removed from the chamber 18 by pressing the bulb portion 88 inwardly and pulling on the handle 57 of the plug assembly. With such a design, the resilient member 38 is easy to mold and facilitates assembly of the valve 10.

In operation, the valve 10 has three basic modes. The normal operating or screening mode is shown in FIGS. 3 and 5, in which the primary screen 58 is positioned transverse to the flow of fluid from the inlet port 22 to the outlet port 24. Particulate matter (not shown) is filtered from the fluid by the screen 58 and builds up on the upstream filtering side 64 of the screen. The filtered fluid passes out of the chamber 18 through the outlet port 24, and the flush port 26 is sealed by the arcuate plate washer 74. With the plug assembly 20 rotated to the filtering position shown in FIGS. 3 and 5, the indexing tab 40 is at one end limit of the arcuate slot 36, thereby preventing further counterclockwise rotation of the plug assembly.

Figure 6:
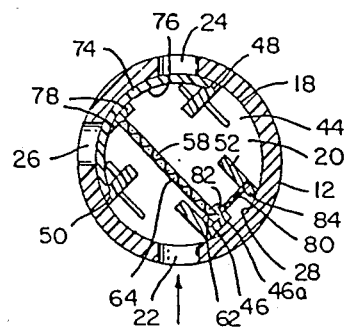
FIG. 6 is a sectional view of the chamber and plug assembly of the valve shown in FIG. 1, showing the plug assembly rotated into the closed mode.

To place the valve 10 in a closed mode to stop the flow of fluid from the outlet port 24, the plug assembly 20 is manually rotated clockwise using the handle 57 to the position shown in FIG. 6. In this mode, the washer 74 is positioned over the flush port 26 and the outlet port 24 to stop all fluid flow from the valve 10.

The valve is shown rotated into the back flushing mode in FIG. 7. In this mode, the washer 74 is positioned over only the outlet port 24. The off-center primary screen 58 is positioned substantially to one side of the inlet port 22, in the path of fluid flow between the inlet port and the flush port 26, with the filtering side 64 of the screen downstream of the flow. In such manner, the fluid flow easily and completely dislodges any particulate matter trapped in the screen 58 from the outwardly diverging ribs 66 and flushes the particulate matter out of the flush port 26 and clear of the valve 10.

In backflushing mode, the second filter 80 is positioned transverse to and over the inlet port 22 to trap any particulate matter in the fluid used to flush the primary screen 58. Since the fluid need flow for only a short period of time to backflush the primary screen 58, the second screen 80 will infrequently need cleaning and can be conveniently cleaned during those times when fluid to the valve 10 is turned off. Cleaning of the second screen 80 is accomplished by removal of the plug assembly 20 from the chamber 18, and sliding the second screen from the plug assembly. With the plug assembly 20 rotated to the flushing position shown in FIG. 7, the indexing tab 40 is at an end limit of the arcuate slot 36 opposite the end limit for the filtering position, and further clockwise rotation of the plug assembly 20 is prevented.

In the presently preferred embodiment of the invention, the top and base plates 42 and 44, the first through fourth support posts 46, 48, 50 and 52, the resilient member 38, the guides 60, and the handle 57 of the plug assembly 20 are molded as one integral part. Furthermore, all parts of the valve 10 may be inexpensively injection molded.

It will be appreciated that, although specific embodiments of the invention have been described herein for purposes of illustration, various modifications may be made without the parting from the spirit and scope of the invention. Accordingly, the invention is not limited except as by the appended claims.

I claim:

1. A rotary fluid stop valve having a structure which facilitates its manufacture by well-known molding techniques, comprising:
    a body having a cylindrical chamber with a circumferential interior cylindrical sidewall, said sidewall having an inlet port and an outlet port;
    a substantially cylindrical plug member rotatably disposed in said chamber, said member having spaced-apart first and second substantially circular end plates connected to said plug member, said plates each having a peripheral seal engaging the interior sidewall of said chamber, said plug member having an arcuate sealing plate positioned between said end plates along a perimeter thereof, said sealing plate being loosely retained between said plates for movement into sealing engagement with said interior sidewall in response to fluid pressure in said chamber;
    said plug member being rotatable between at least a first position wherein the ports are open to allow passage of fluid therebetween and a second position wherein at least one of said ports is blocked by said arcuate sealing plate;
    said sealing plate being curved of the shape of the cylindrical sidewall, the curved sealing plate being smooth, uniform, non-point loaded, and larger than the port to be closed so that the sealing plate can slide over the port to be closed in a direction parallel to the curve of the cylindrical sidewall while exposed to fluid pressure in the direction perpendicular to the cylindrical sidewall.

2. The valve of claim 1, said body being capable of being removable from a mold in one direction, and said circular end plates being integrally connected to said plug member.

3. A rotary valve having a body with a cylindrical chamber having:
    a cylindrical sidewall having at least two ports therein;
    an axial bore defined by the cylindrical sidewall
    a plug member fitted within said axial bore of said chamber and having a pair of opposite circular flat end plates fitted with peripheral seals for closing said axial bore; and
    separate sealing means fitted between said circular plates and movable radially outwardly toward said chamber sidewall in overlapping relation to one of said ports in response to fluid pressure in said chamber to close one of said ports and prevent passage of fluid through said port, said plug member being rotatable in said axial bore to move said sealing means out of an overlapping position with said port to allow free passage of fluid through said port;
    said sealing means being curved of the shape of the cylindrical sidewall, the curved sealing means being smooth, uniform, non-point loaded, and larger than the port to be closed so that the sealing means can slide over the port to be closed in a direction parallel to the curve of the cylindrical sidewall while exposed to fluid pressure in the direction perpendicular to the cylindrical sidewall.

4. The valve of claim 3, said sealing means including a flexible arcuate plate loosely held in said plug member, said flat end plates each having support posts for receiving the arcuate plate washer for preventing circumferential and radially inward movement, but allowing free outwardly radial movement.

5. The valve of claim 4, wherein said valve is plastic and said body being capable of being removed from a mold in one direction, and said circular end plates being integrally connected to said plug member.

6. The valve of claim 3, wherein said peripheral seals are o-ring seals each housed in a peripheral groove in its respective circular end plate.

* * * * *